(12) United States Patent
Vaughn

(10) Patent No.: US 8,991,443 B1
(45) Date of Patent: Mar. 31, 2015

(54) AIR FLOW CONTROLLER FOR PNEUMATICALLY OPERATED WATERCRAFT LIFTS

(75) Inventor: Michael D. Vaughn, Ketchum, OK (US)

(73) Assignee: Hydrohoist Marine Group, Inc.

( * ) Notice: Subject to any disclaimer, the term of this patent is extended or adjusted under 35 U.S.C. 154(b) by 2663 days.

(21) Appl. No.: 11/545,901

(22) Filed: Oct. 11, 2006

(51) Int. Cl.
*B65B 31/00* (2006.01)
*B60V 1/14* (2006.01)

(52) U.S. Cl.
CPC .......................................... *B60V 1/14* (2013.01)
USPC ................................ 141/46; 141/37; 141/301

(58) Field of Classification Search
USPC ........ 141/37, 46, 67, 114, 301, 313; 137/107; 114/44, 55, 49, 54; 405/3
See application file for complete search history.

(56) References Cited

U.S. PATENT DOCUMENTS

| | | | | | |
|---|---|---|---|---|---|
| 154,390 | A | * | 8/1874 | Hartman | 137/107 |
| 2,725,076 | A | * | 11/1955 | Hansen et al. | 137/543.15 |
| 4,763,592 | A | * | 8/1988 | Russ | 114/45 |
| 4,782,778 | A | * | 11/1988 | Barbaglia | 114/52 |
| 5,718,847 | A | * | 2/1998 | Koble, Jr. | 261/97 |
| 7,096,809 | B1 | * | 8/2006 | Victor | 114/45 |
| 7,421,963 | B1 | * | 9/2008 | Victor | 114/45 |
| 2006/0156964 | A1 | * | 7/2006 | Canniffe et al. | 114/49 |

* cited by examiner

*Primary Examiner* — Jason K Niesz
(74) *Attorney, Agent, or Firm* — Gable Gotwals

(57) ABSTRACT

An air flow controller for a pneumatically operated watercraft lift has a valve for opening and closing the air line to the pontoon and a manifold with a gate. The gate is biased to a first orientation in which air from the pontoon can be exhausted only to the atmosphere when the lift blower is switched "off." When the blower is switched "on," air flow from the blower moves the gate into a second orientation in which the blower can force air only into the pontoon. This configuration prevents flow of water into the blower during lowering of the pontoon while using relatively few and simple valve system components.

9 Claims, 4 Drawing Sheets

AIR FLOW CONTROLLER FOR PNEUMATICALLY OPERATED WATERCRAFT LIFTS

BACKGROUND OF THE INVENTION

This invention relates generally to lifts for watercraft and more particularly concerns air flow controllers used to raise and lower pneumatically operated lifts for watercraft.

In some known air flow controllers, when the watercraft is being lowered into the water, air exiting the pontoons passes through the motor of the controller. However, water may also pass through, and possibly damage, the motor. A manually operated dump valve is sometimes used to release the air from the pontoons without permitting water to pass through the motor, but this necessitates the manual operation of both the main controller valve and the dump valve to operate the system.

One solution to the multiple manual operation problem is the use of three valves in conjunction with the controller manifold including a main valve between the manifold and the pontoons, a dump valve between the manifold and the atmosphere and a check valve between the manifold and the motor. One manual operation is required to open or close the main valve. When the motor is not running, the dump valve and check valve are automatically opened and closed, respectively, to pass the air and water to the atmosphere to lower the lift if the main valve is opened. When the motor is running, the dump valve and check valve are automatically closed and opened, respectively, to force air into the pontoons to raise the lift if the main valve is opened. While this type of controller eliminates the need for multiple manual valve operations, it requires three rather than two valves.

Another solution to the multiple manual operation problem is to use a three-way valve. In its first position, the valve connects the pontoons to the motor. In its second position, the valve connects the pontoons to the atmosphere. In its third position, the valve disconnects the pontoons from both the motor and the atmosphere. While this type of controller eliminates the need for multiple manual valve operations and reduces the number of valves required, it necessitates the use of a comparatively expensive three-way valve and creates valve orientation and air flow efficiency problems.

It is, therefore, an object of this invention to provide an air flow controller for lifts for watercraft. Another object of this invention is to provide an air flow controller which prevents backflow of water into the controller motor. It is also an object of this invention to provide an air flow controller which requires only one manual valve operation to initiate raising or lowering of the lift. Still another object of this invention is to provide an air flow controller which does not require any three-way valves for its operation. A further object of this invention is to provide an air flow controller which requires less than three valves for its operation.

SUMMARY OF THE INVENTION

In accordance with the invention, an air flow controller is provided for use in raising and lowering a pneumatically operated watercraft lift. The controller directs air flow into and out of a pontoon of the lift to raise and lower the pontoon in a body of water. The controller has a manifold with a gate. A first pneumatic path extends between the manifold and the pontoon. A second pneumatic path exits from the manifold. The gate is biased, perhaps by use of a spring, to a first orientation permitting pneumatic communication between the first and second paths via the manifold. In this orientation, air can be exhausted from the pontoon to the atmosphere to lower the pontoon. If the bias is overcome, the gate moves to a second orientation preventing pneumatic communication between the first and second paths so that air cannot be exhausted from the pontoon through the second path. A valve in the first path allows the user to open or close the first path to permit air to enter or exit the pontoon. The bias may be overcome by use of a third pneumatic path into the manifold with a blower connected in the third path. When the blower is switched "off," the gate is in the first orientation and, if the valve is opened, air is exhausted from the pontoon to the atmosphere to lower the pontoon. When the blower is switched "on," air flow from the blower moves the gate into the second orientation and, if the valve is opened, the blower forces air into the pontoon to raise the pontoon.

In one preferred embodiment of the controller, the manifold has three ports. A first of the ports is used for pneumatic communication with the pontoon. A second of the ports is used for pneumatic communication with the atmosphere. A third of the ports is used for pneumatic communication with the blower. The gate moves between first and second orientations in the manifold. The pontoon and atmosphere ports are in pneumatic communication when the gate is in the first orientation and the pontoon and blower ports are in pneumatic communication when the gate is in the second orientation. The gate is biased to maintain the gate in its first orientation when the blower is "off." The bias is overcome by the flow of air through the blower port to maintain the gate in its second orientation when the blower is "on." The valve is connected in a pneumatic path between the first port and the pontoon. The blower can be switched between an "off" position in which the gate is in its first orientation and an "on" position in which air flow from the blower moves the gate into its second orientation. Biasing is accomplished by use of a shaft fixed to gate and journalled for rotation in the manifold. An arm external to the manifold and extending radially from the shaft for rotation with the shaft is connected by a coil spring under tension to a fixed point relative to the controller. Thus, a single "on-off" valve and a manifold with a two-way gate control the raising and lowering of the pontoon.

BRIEF DESCRIPTION OF THE DRAWINGS

Other objects and advantages of the invention will become apparent upon reading the following detailed description and upon reference to the drawings in which.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Figure 1:
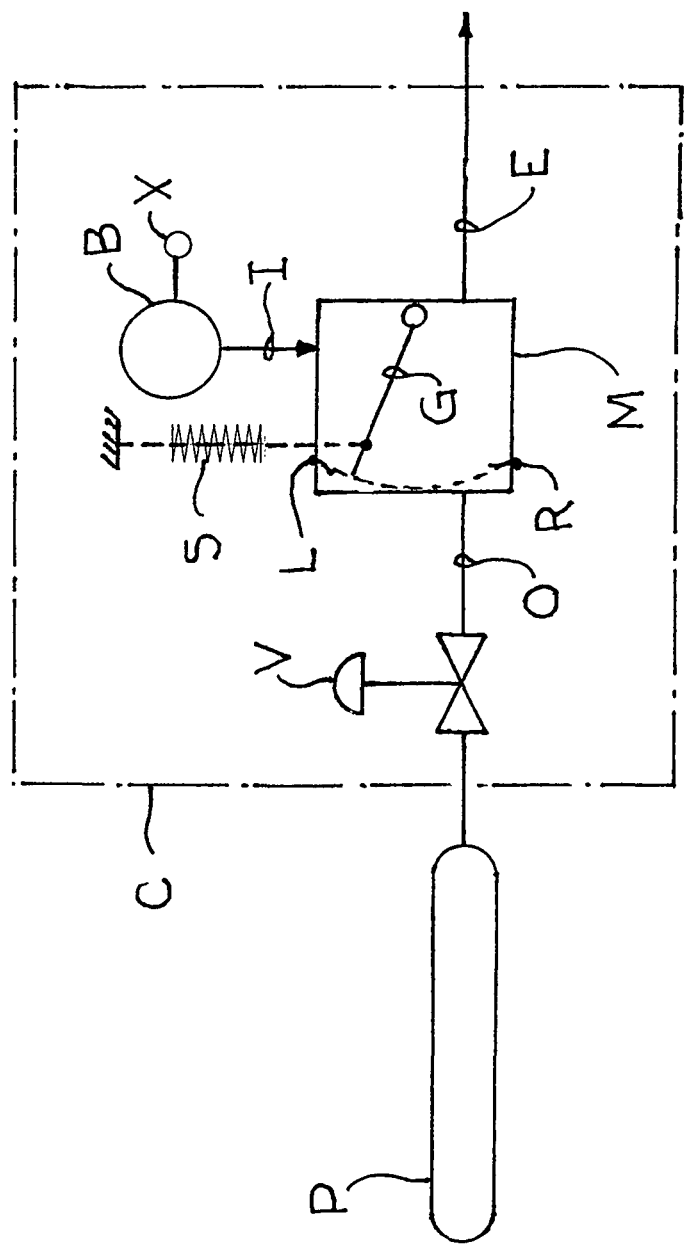
FIG. 1 is a block schematic diagram of the air flow controller.

Turning first to FIG. 1, an air flow controller C for use in raising and lowering a pneumatically operated watercraft lift is illustrated. The controller C directs air flow into and out of one or more pontoons P of the lift to raise and lower the lift in a body of water. The controller C has a manifold M with a gate G which divides the manifold M into compartments on either side of the gate G. A first pneumatic path O extends between the manifold M and the pontoon P. A second pneumatic path E exits from the manifold M. The gate G is biased, perhaps by use of a spring S as shown, to a first orientation L permitting pneumatic communication between the first and second paths O and E via the manifold M, one of the compartments defined by the gate G connecting the first and second paths O and E. In this orientation L, air can be exhausted from the pontoon P to the atmosphere to lower the pontoon P. If the bias is overcome, the gate G moves to a second orientation R in which the first and second paths O and E extend from different compartments defined by the gate G, preventing pneumatic communication between the first and second paths O and E. Therefore, air cannot be exhausted from the pontoon P through the second path E. A valve V in the first path O allows the user to open or close the first path O to permit air to enter or exit the pontoon P. The bias may be overcome by use of a third pneumatic path I into the manifold M with a blower B connected in the third path I. When the blower switch X is "off," the gate G is in the first orientation L and, if the valve V is opened, air is exhausted from the pontoon P to the atmosphere to lower the pontoon P without passing air or water through the blower B. When the blower switch X is "on," air flow from the blower B moves the gate G into the second orientation R and, if the valve V is opened, the blower B forces air into the pontoon P to raise the pontoon P.

Figure 2:
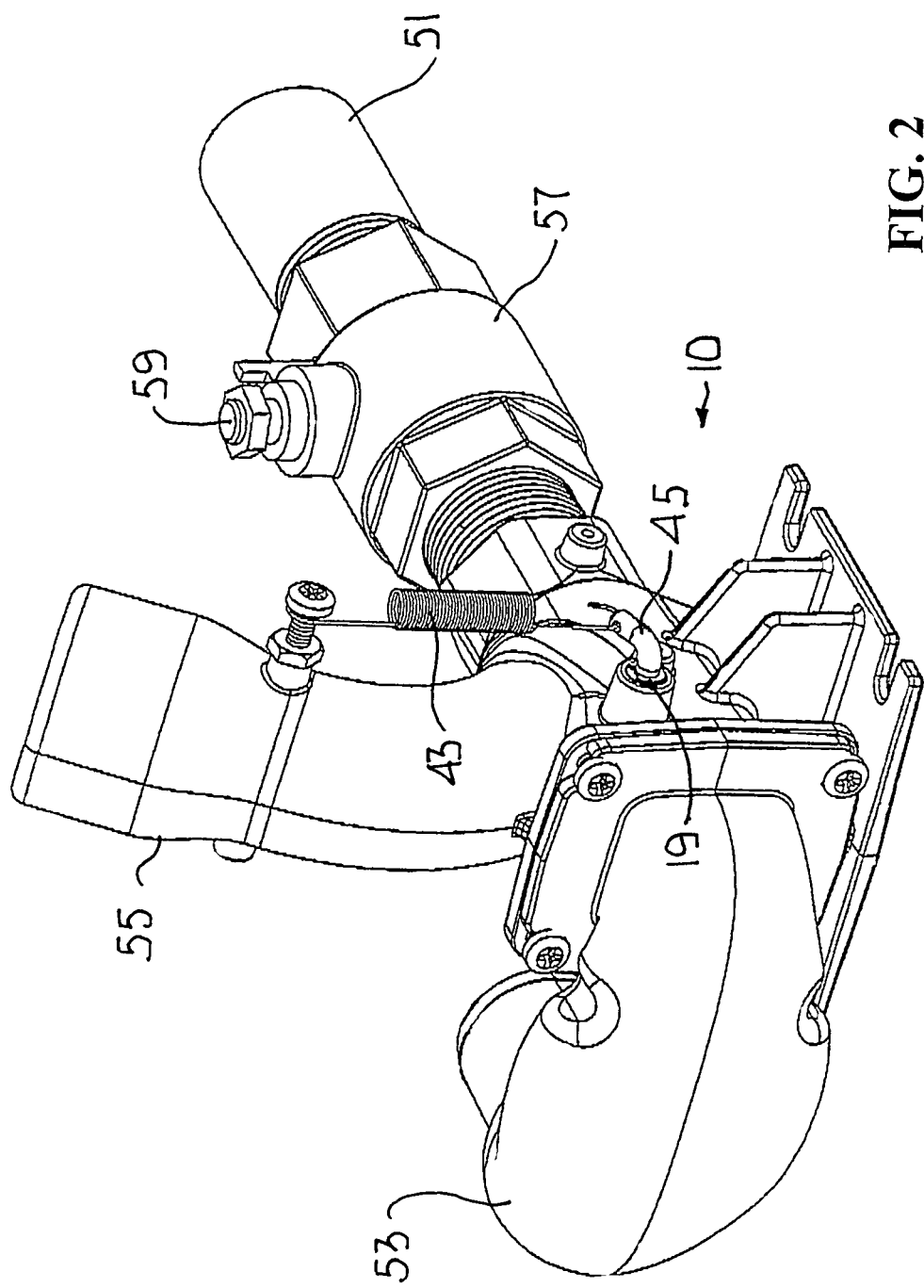
FIG. 2 is a rear right perspective view of a preferred embodiment of the manifold, gate and ports of the air flow controller.
Figure 3:
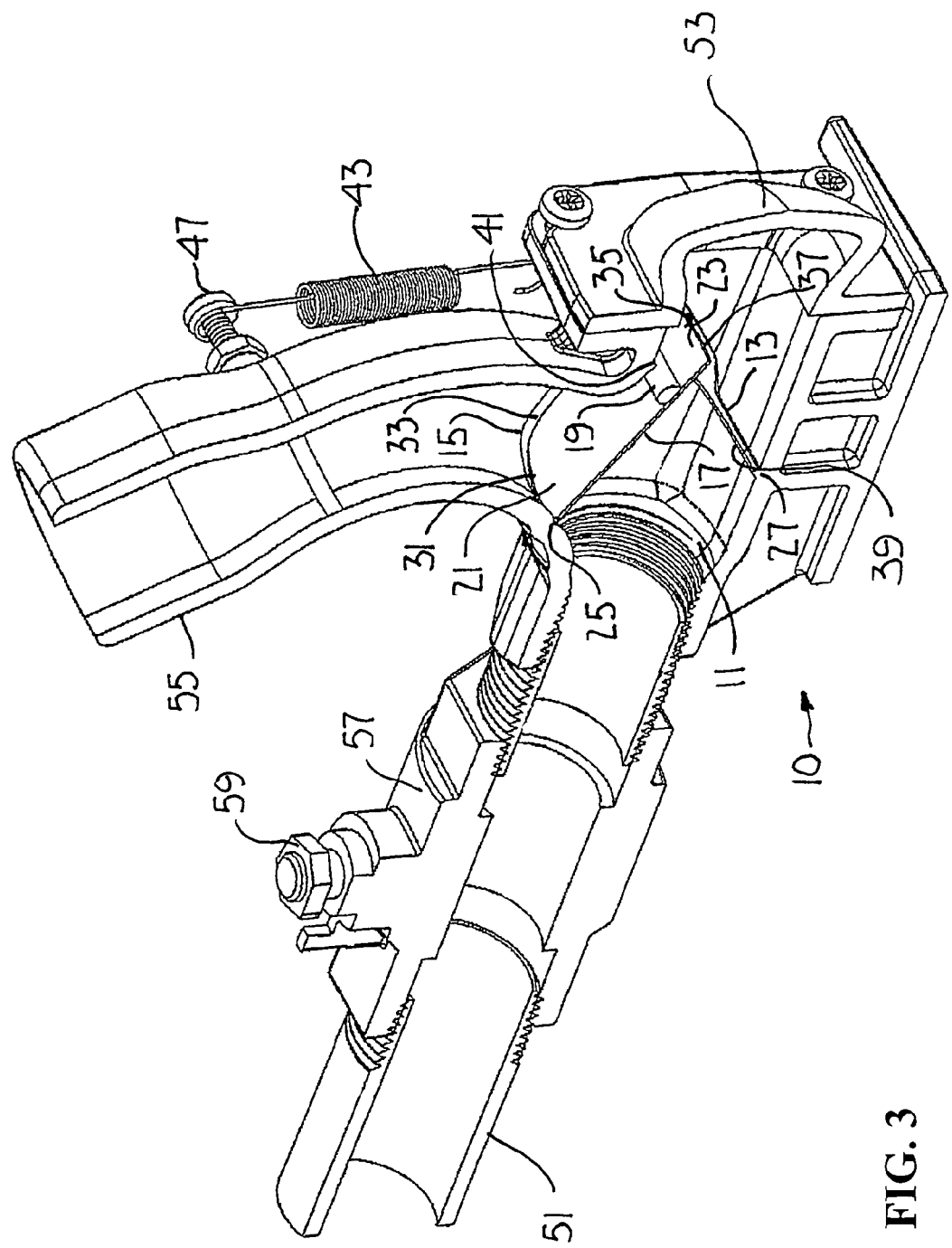
FIG. 3 is a rear left perspective view of a preferred embodiment of the manifold, gate and ports of FIG. 2 with parts broken away.

Looking at FIGS. 1-3, in one preferred embodiment the manifold 10 has three ports. A first port 11 is used for pneumatic communication with the pontoon P. A second port 13 is used for pneumatic communication with the atmosphere. A third port 15 is used for pneumatic communication with the blower B. The gate G is a flapper 17 with an off-center shaft 19. The shaft 19 divides the flapper 17 into large and small segments 21 and 23. The flapper 17 rotates with the shaft 19 between first and second orientations 25 and 27 in the manifold 10. In the first orientation 25, the perimeter 31 of the large segment 21 of the flapper 17 is rotated upwardly to abut a seat 33 along the third port 15 of the manifold 10 and the perimeter 35 of the small segment 23 of the flapper 17 is rotated downwardly to abut a seat 37 along the third port 15 of the manifold 10, thus blocking communication between the third port 15 and the manifold 10. In the second orientation 27, the perimeter 31 of the large segment 21 of the flapper 19 is rotated downwardly to abut a seat 39 along the second port 13 of the manifold 10 and the perimeter 35 of the small segment 23 of the flapper 17 is rotated upwardly to abut a seat 41 along the second port 13 of the manifold 10, thus blocking communication between the second port 13 and the manifold 10. The pontoon and atmosphere ports 11 and 13 are in pneumatic communication when the gate 17 is in the first orientation 25 and the pontoon and blower ports 11 and 15 are in pneumatic communication when the gate 17 is in the second orientation 27. The gate 17 is biased by a spring 43 to maintain the gate 17 in its first orientation 25 when the blower is "off." The bias is overcome by the flow of air through the blower port 15 to maintain the gate 17 in its second orientation 27 when the blower B is "on." Biasing is accomplished by use of the shaft 19 on which the flapper 17 is mounted. The shaft 19 is journalled for rotation in the manifold 10 and an arm 45 external to the manifold 10 extends radially from the shaft 19 for rotation with the shaft 19. The arm 45 is connected by the coil spring 43 under tension to a fixed point relative to the longitudinal axis of the shaft 19, as shown to a post 47 fixed on the duct 55 connecting the third port 15 to the blower B.

Figure 4:
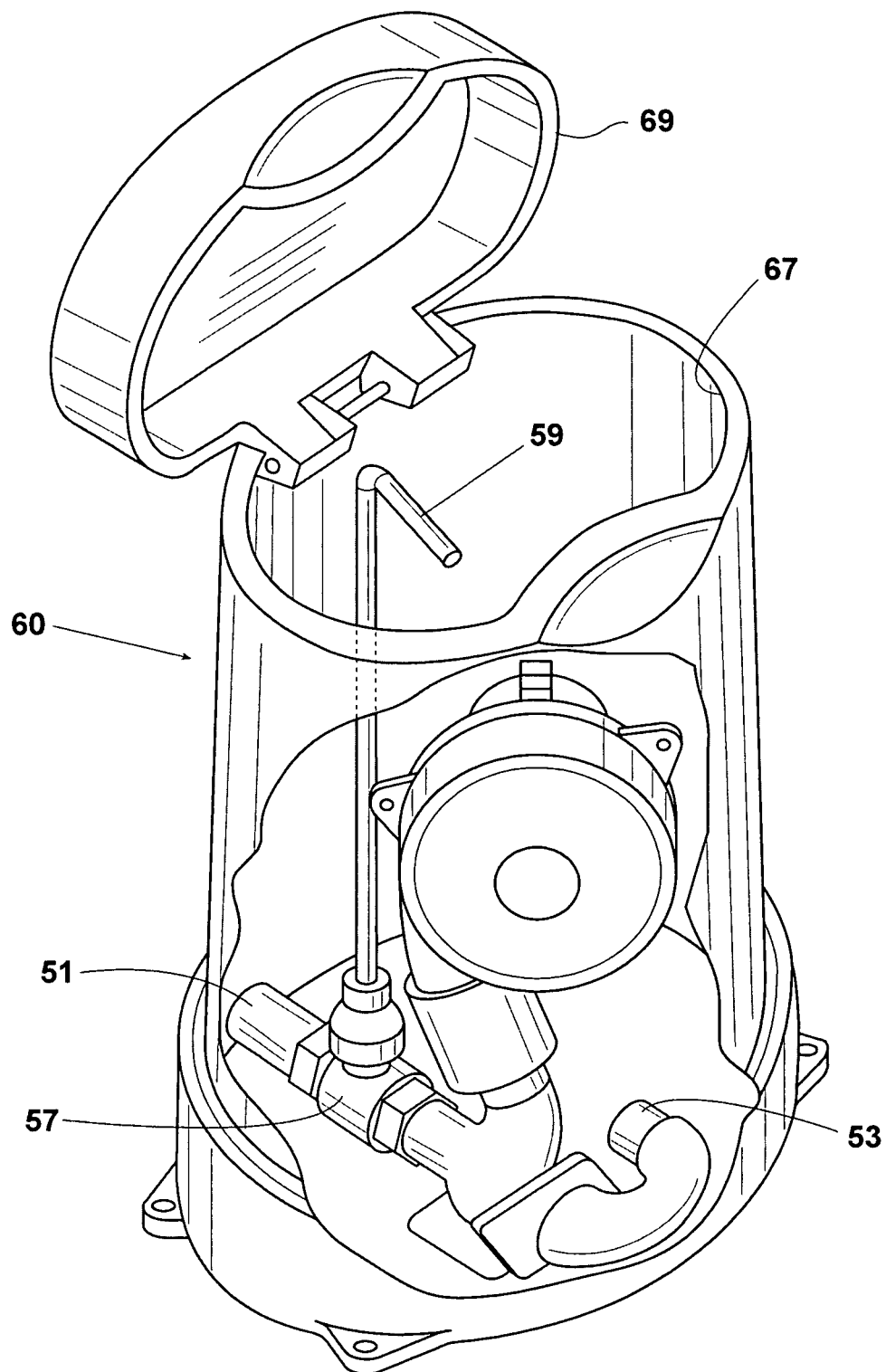
FIG. 4 is perspective view of the controller according to FIG. 1 with the manifold of FIGS. 2 and 3 contained in a case for mounting on a dock.

The pontoon duct 51 extends generally horizontally from the first port 11 of the manifold 10. The exhaust duct 53 extends generally horizontally in a U-shaped configuration from the exhaust port 13 of the manifold. The blower duct 55 extends generally vertically from the manifold 10. As best seen in FIG. 4, this allows the controller C to be contained in a case 60 having a base 61 with a very small footprint, conserving valuable dock space. The case 60 has a removable cover 63 with a first opening 65 through which the ducts 51 and 53 to the pontoon P and atmosphere can be extended and a second opening 67 through the top of the cover 60. A lid 69 hinged to the cover 63 allows the user to access the controller and operate the valve handle 59 which is extended upwardly from the valve 57.

Thus, there has been provided, in accordance with the invention, an air flow controller that fully satisfies the objects, aims and advantages set forth above. While the invention has been described in conjunction with a specific embodiment thereof, many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For directing air flow into and out of a pontoon of a pneumatically operated watercraft lift to raise and lower the pontoon in a body of water, a controller comprising:
   a manifold having a gate;
   a first pneumatic path extending between said manifold and the pontoon;
   a second pneumatic path exiting from said manifold;
   means for biasing said gate to maintain said gate in a first orientation to permit pneumatic communication between said first path and said second path through said manifold; and
   means for overcoming said biasing means to maintain said gate in a second path through said manifold.

2. A controller according to claim 1 further comprising a valve in said first path for opening and closing said first path.

3. A controller according to claim 1, said means for overcoming comprising:
   a third pneumatic path into said manifold; and
   a blower connected in said third path.

4. A controller according to claim 3 further comprising means for switching said blower between an "off" position in which said gate is in said first orientation and an "on" position in which air flow from said blower moves said gate into said second orientation.

5. A controller according to claim 3, said means for biasing comprising a spring.

6. For directing air flow into and out of a pontoon of a pneumatically operated watercraft lift to raise and lower the pontoon in a body of water, a controller comprising:
   a manifold having three ports, a first of said ports for pneumatic communication with the pontoon, a second of said ports for pneumatic communication with the atmosphere and a third of said ports for pneumatic communication with a blower;
   a gate movable between first and second orientations in said manifold, said pontoon and atmosphere ports being in pneumatic communication when said gate is in said first orientation and said pontoon and blower ports being in pneumatic communication when said gate is in said second orientation; and means for biasing said gate to maintain said gate in said first orientation when said blower is "off," said means for biasing being overcome by a flow of air through said blower port to maintain said gate in said second orientation when said blower is "on."

7. A controller according to claim 6 further comprising a valve connected in a pneumatic path between said first port and the pontoon for opening and closing said path.

8. A controller according to claim 6 further comprising means for switching said blower between an "off" position in which said gate is in said first orientation and an "on" position in which air flow from said blower moves said gate into said second orientation.

9. For directing air flow into and out of a pontoon of a pneumatically operated watercraft lift to raise and lower the pontoon in a body of water, a controller comprising:
 a manifold having three ports, a first of said ports for pneumatic communication with the pontoon, a second of said ports for pneumatic communication with the atmosphere and a third of said ports for pneumatic communication with a blower;
 a gate movable between first and second orientations in said manifold, said pontoon and atmosphere ports being in pneumatic communication when said gate is in said first orientation and said pontoon and blower ports being in pneumatic communication when said gate is in said second orientation; and
 means for biasing said gate to maintain said gate in said first orientation when said blower is "off," said means for biasing being overcome by a flow of air through said blower port to maintain said gate in said second orientation when said blower is "on," said means for biasing comprising:
  a shaft fixed to said gate and journalled for rotation in said manifold;
  an arm external to said manifold and extending radially from said shaft for rotation therewith; and
  a coil spring connected under tension between said rotatable arm and a fixed point; and
 means for switching said blower between an "off" position in which said gate is in said first orientation and an "on" position in which air flow from said blower moves said gate into said second orientation.

\* \* \* \* \*